(12) United States Patent
Rishe

(10) Patent No.: US 10,191,945 B2
(45) Date of Patent: Jan. 29, 2019

(54) GEOLOCATING SOCIAL MEDIA

(71) Applicant: Naphtali David Rishe, Miami Beach, FL (US)

(72) Inventor: Naphtali David Rishe, Miami Beach, FL (US)

(73) Assignee: The Florida International University Board of Trustees, Miami, FL (US)

( * ) Notice: Subject to any disclaimer, the term of this patent is extended or adjusted under 35 U.S.C. 154(b) by 853 days.

(21) Appl. No.: 14/184,399

(22) Filed: Feb. 19, 2014

(65) Prior Publication Data

US 2014/0236882 A1 Aug. 21, 2014

Related U.S. Application Data

(60) Provisional application No. 61/767,036, filed on Feb. 20, 2013.

(51) Int. Cl.
*G06F 17/30* (2006.01)

(52) U.S. Cl.
CPC .. *G06F 17/30477* (2013.01); *G06F 17/30241* (2013.01)

(58) Field of Classification Search
CPC ................ G06N 5/02; G06F 17/30477; G06F 17/30241
(Continued)

(56) References Cited

U.S. PATENT DOCUMENTS 7,698,336 B2* 4/2010 Nath ................. G06F 17/30241
707/737

7,853,596 B2* 12/2010 Ma .................... G06F 17/30241
707/741
(Continued)

FOREIGN PATENT DOCUMENTS

WO WO 2009/070841 A1 * 6/2009 ............. G06F 17/40
WO WO 2009/070841 A1 * 6/2009 ............. G06F 17/40

OTHER PUBLICATIONS

"Location Inference using Microblog Messages", Yohei Ikawa, Miki Enoki, Michiaki Tatsubori, Proceeding WWW'12 Companion Proceedings of the 21$^{st}$ International Conference on World Wide Web, Lyon, France—Apr. 16-20, 2012, pp. 687-690.*
(Continued)

*Primary Examiner* — Alan Chen
(74) *Attorney, Agent, or Firm* — Saliwanchik, Lloyd & Eisenschenk

(57) ABSTRACT

Techniques for geolocating social media are described. According to an embodiment, information from textual content of a non-geolocated social media data item stored in a database is extracted. A knowledge database is then searched for a cluster of geo-located social media data items to which the information most closely relates, and an estimated location is assigned to the non-geolocated social media data item according to the cluster to which the information most closely relates. Each cluster comprises one or more representative tags for a spatio-temporal region. The knowledge database is created from geolocated social media data by grouping data according to location and extracting representative tags from the location's grouping of data according to textual content as well as information related to reliability and truthfulness of the textual content.

19 Claims, 5 Drawing Sheets

(58) Field of Classification Search
 USPC .......................................................... 706/50
 See application file for complete search history.

(56) References Cited

U.S. PATENT DOCUMENTS

| | | | | |
|---|---|---|---|---|
| 2008/0027893 | A1 | 1/2008 | Cavestro et al. | |
| 2010/0145947 | A1* | 6/2010 | Kolman | G06F 17/3087 707/736 |
| 2011/0082825 | A1* | 4/2011 | Sathish | G06Q 30/08 706/46 |
| 2012/0278395 | A1* | 11/2012 | Garcia | G06Q 10/00 709/205 |
| 2013/0022282 | A1* | 1/2013 | Cooper | G06K 9/622 382/225 |
| 2014/0214819 | A1* | 7/2014 | Aitchison | G06F 17/30241 707/724 |

OTHER PUBLICATIONS

Amitay, Einat et al., "Web-a-Where: Geo Tagging Web Content," *IBM Haifa Research Lab*, 2004, 273-280.
Gundecha, Pritam et al., "Mining Social Media: A Brief Introduction," *Tutorials Operations Research*, 2012, 1-17.

\* cited by examiner

GEOLOCATING SOCIAL MEDIA

CROSS REFERENCE TO RELATED APPLICATION

The present application claims the benefit of U.S. Provisional Application Ser. No. 61/767,036, filed Feb. 20, 2013, which is hereby incorporated by reference herein in its entirety, including any figures, tables, or drawings.

GOVERNMENT SUPPORT

This invention was made with government support under Award Number IIP-0829576 awarded by the National Science Foundation. The government has certain rights in the invention.

BACKGROUND

Data mining refers to the analysis of large data sets to discover interesting patterns and gain information. The information obtained from data mining can provide insight into dimensional relationships between fields such as transactions, sales, date/time, health, environment, biology, and products. Applications of data mining include, but are not limited to, discovering buying patterns/sales trends, discovering biomarkers and performing gene mapping, detecting fraud, performing forensics, as well as predicting behaviors.

One emerging area of interest for data mining includes social media. Patterns of behavior and content available from the pervasive use of social media have widespread applications for improving business, providing humanitarian relief, and assisting users as a few examples.

Social media refers to Internet-based applications that propagate user-generated content. Social media include social networking applications, blogs, wikis, and other content (e.g., image, video, text) sharing applications. A massive amount of content (and associated data) is generated and posted to social media sites. Unlike traditional "structured" attribute-value data, social media data is often noisy (i.e., contain issues with trustworthiness) and unstructured (e.g., do not necessarily contain cohesive or consistent attributes).

One attribute that can be useful for uncovering patterns in social media content is source location. However, currently, only a minority of social media content include this attribute.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques for providing estimated geographic coordinates indicating location source for social media posts are disclosed. By assigning geographic coordinates indicating a location source for social media data, the social media data can be analyzed for emerging patterns and relationships to location attributes.

According to one embodiment, a knowledge base can be created that includes one or more representative keywords (with corresponding weights or probabilities) for each cluster of geolocated social media data, where each cluster corresponds to a spatio-temporal region.

According to another embodiment, the knowledge base can be created by grouping geolocated social media data according to geographical area and extracting representative tags. The representative tag extraction can be accomplished by ranking tags for the data within a cluster. The rankings for the tags may be used to provide a weight for a keyword and/or to select the keywords representing a particular location (or region) during a particular time frame.

According to yet another embodiment, non-geolocated social media data can be assigned an approximate geolocation using the knowledge base prepared from geolocated data. Keywords and other metadata can be extracted from the non-geolocated social media data and used to search for a highest probability matching cluster from the knowledge base.

DETAILED DISCLOSURE

Figure 1:
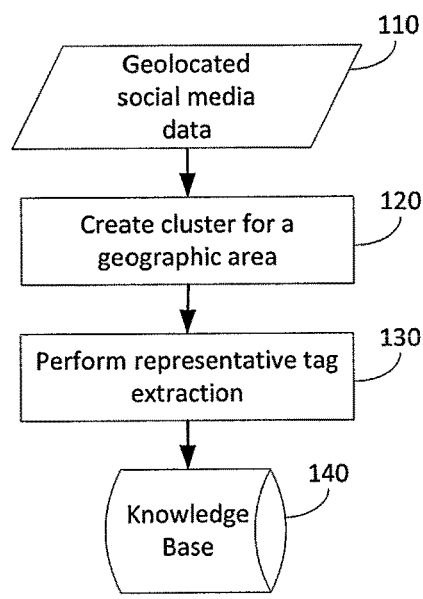
FIG. 1 shows a process flow for creating a knowledge base according to an embodiment of the invention.

Techniques for providing estimated geographic coordinates indicating location source for social media posts are disclosed. By assigning geographic coordinates indicating a location source for social media data, the social media data can be analyzed for emerging patterns and relationships to location attributes.

A social media post—including images, photographs, tweets, blog posts, and other messages—can include content and metadata including keyword tags. Keyword tags are useful in connection with performing operations on data accumulated from social media posts such as, for example, sorting, searching and/or retrieval of files based on tags having keywords matching specified criteria. In addition to using keyword tags for direct operations on the data, keyword tags are useful in grouping and analyzing the social media data to uncover patterns.

In some cases, the keyword tags may be obtained from the content itself (through word recognition of text or image recognition of images). In other cases, the keyword tags may be obtained from metadata associated with a social media post.

File formats of metadata associated with social media posts may include, but are not limited to, Exchangeable Image File Format (EXIF), International Press Telecommunication Council (IPTC), and Extensible Metadata Platform (XMP).

Some images, messages, or other content posts on social media include metadata of a source location attribute in the form of geographic coordinates ("geo-coordinates").

"Geo-tagging" refers to the inclusion of geo-coordinates (or other geographical location information) in the metadata associated with an image or social media message. In the case of uploaded photographs, some cameras, especially ones that are built into smart phones, automatically geo-tag the images and record coordinates in the metadata of the image. Similarly, when the functionality is available, messages posted from smart phones or other mobile devices may be geo-tagged. Generally, geo-tags include geographical location information such as the latitudinal and longitudinal coordinates (and in some cases altitude) of the location where an image (e.g., a photograph) is captured or where a device on which a user posts (or uploads) the image or a message to a social media site is located at the time of the post.

Automatic geo-tagging typically refers to using a device (e.g., digital still camera, digital video camera, mobile device with image sensor) having a geographical positioning system (GPS) to associate GPS coordinates with an image captured with the device (and locally stored or uploaded into a remote database). Mobile devices such as cell phones and smart phones and many other GPS enabled devices are able to retrieve geo-coordinates of the location at the time a user posts a message to a social media site and append the geo-coordinates (and even a timestamp) to the message. Thus, automatic geo-tagging also can be performed through social media applications when a user posts a message or image when using a GPS-enabled device. For example, in the case of a tweet or other message that was posted from a smart phone, geo-coordinates may be available in the metadata of the tweet itself should that functionality be turned on in the smart phone.

In some cases, instead of or in addition to GPS coordinates, CellID (also referred to as CID and which is the identifying number of a cellular network cell for a particular cell phone operator station or sector) may be used to indicate location.

Although geo-tagging capabilities exist, in a majority of cases, however, a social media post (e.g., message, photograph, or video) is not geo-tagged. This makes it significantly more difficult to determine the source location of the data (e.g., message or image).

Embodiments of the invention enable the approximate geolocation of social media data that does not contain location coordinates in its metadata.

According to certain embodiments of the invention, geolocation information is assigned to non-geo-tagged social media data through the use of a knowledge base (an organized structure of data). The knowledge base may be created from a database containing the social media data being analyzed or may be provided for use with the social media data being analyzed once the knowledge base is created from either the database containing the social media data being analyzed or some other database. In some cases, after the knowledge base is created, the knowledge base may be updated periodically or at certain times as new social media data having geo-tags becomes available.

The data sets acted upon and analyzed can be obtained from various sources and across multiple databases. One application for analyzing data from social media sites involves looking for patterns or activities revolving around a certain geographical location or region. Analysts may want to determine and find relationships or trends to what people from a region are discussing or sharing—including politics, people or companies, products and even events, actions, sentiment or other items of interest.

As one process, a knowledge base of location based data clusters can be created and representative information can be established. In another process, an approximate geolocation can be assigned to social media data that does not contain location coordinates in its metadata.

According to certain embodiments, geolocated social media data is used to create a knowledge base of location based data clusters with representative information. The representative information can be the popular keywords (or "tags") used to describe an item in the dataset.

The knowledge base creation process may begin with finding all data having the appropriate tags with geo-coordinates in the set of data being analyzed. This data can be referred to as "geolocated social media data." The geolocated social media data is processed to create location based data clusters and establish the representative information.

First, each geographic area and the social media data determined to be associated with this area are considered. Then, the system attempts to extract one or more representative or popular tags for that area.

FIG. 1 shows a process flow for creating a knowledge base according to an embodiment of the invention.

From the geolocated social media data (110), clusters for a geographic area are created (120). For example, the items, such as photographs or messages, from the dataset having geo-tags are clustered using the latitudes and longitudes. In one embodiment, clustering is performed through a method that finds a centroid for the set and ranks the photos according to their distance from the centroid. In another embodiment, a data mining algorithm such as a k-means clustering algorithm can be used. For the k-means clustering algorithm, the data can be mined based on longitude and latitude, and geographical distance can be used as the distance metric. Although two methods are explicitly mentioned herein, these methods should not be construed as limiting and other methods may be used for creating the clusters.

In certain embodiments, once the data is clustered according to location, the dates associated with the data may be considered. First, the deviation in the dates of the items in the cluster is determined. Clusters showing high variability in dates may be considered to have higher importance than clusters showing lower variability in dates since high variability in dates can imply that the view may be considered of continued interest. Less deviation in the dates indicates that items, such as photographs, in that cluster were posted or taken around the same date. This may indicate that items are related to an event rather than a geographic feature.

Figure 2:
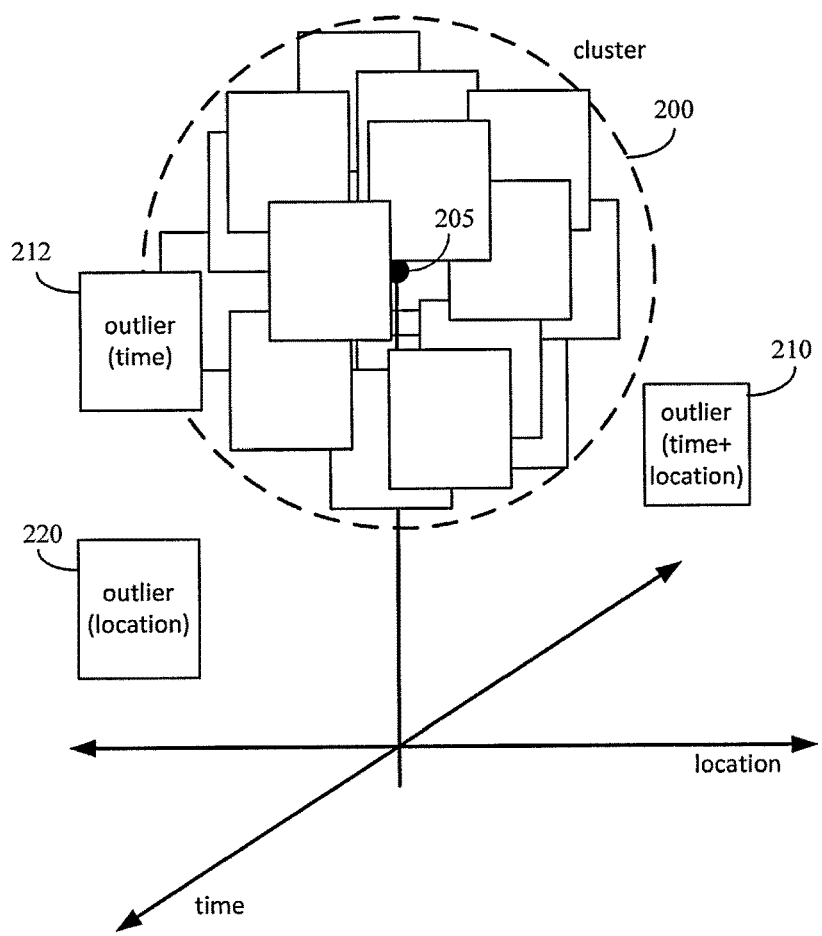
FIG. 2 shows a representation of a cluster according to an embodiment of the invention.

FIG. 2 shows a representation of a cluster according to an embodiment of the invention. Referring to FIG. 2, a set of geolocated social media data creates a cluster 200 around a location point 205. Two dimensions may be analyzed—location and time. The cluster 200 can include data located a distance from the location point 205 and may also be grouped based on a time period (which may be hours, days, weeks, months, and even years). Thus, there may exist clusters for the same location, but at different periods of time. Some social media data may not be included in a cluster (or used to establish representative tags) when the data is outside of the parameters for the cluster, for example, as being an outlier due to distance from location point 205 and the time frame (e.g., outlier 210), as being an outlier due to the timestamp being outside of the time frame (e.g., outlier 212), or as being an outlier due to being too far in distance from the location point 205 (outlier 220).

Returning to FIG. 1, after creating the clusters (120), representative tag extraction can be performed (130) and the clusters and representative tags can be stored in a knowledge base (140). According to certain embodiments, the representative tag extraction (130) can be accomplished by ranking tags for those items within a cluster. The rankings for the tags may be used to provide a weight for a keyword and/or to select the keywords representing the cluster (i.e., representing a particular location).

Instead of simply ranking frequency of keywords across an entire area of interest, embodiments rank keywords within clusters. According to one aspect, ranking is performed to find a likely representative tag for a particular location while considering the trustworthiness and reliability of the representative tag. Trustworthiness and reliability are considered because there are often tags or words that are either intentionally or unintentionally deceptive. Not only are trustworthy tags being sought for representing a cluster, but a probability that the tags provide a useful representation for the location when found in a non-geolocated data is also pursued.

The ranking may be based on the frequency with which the tags appear within a particular cluster (with an assumption that the higher the frequency of the tag within the cluster the more representative the tag is for that cluster). Some other aspects that may be used in ranking keywords for a cluster include, but are not limited to, ownership and views. Ownership refers to the identity of who posted the item to the social media site (may be, but is not necessarily, the author). The number of views refers to a metric available from a number of social media sites that indicates how many times an item is viewed, clicked on, shared, or otherwise propagated.

For example, regarding ownership, if there are different owners that use the same tag, then the tag may be more valuable (have a higher ranking) based on the assumption that the more diversity in ownership the more trustworthy the tag. Similarly, a greater number of views might signify the importance of an item such as an image, as it is assumed that a high number of people would not view images that are less significant.

Figure 3:
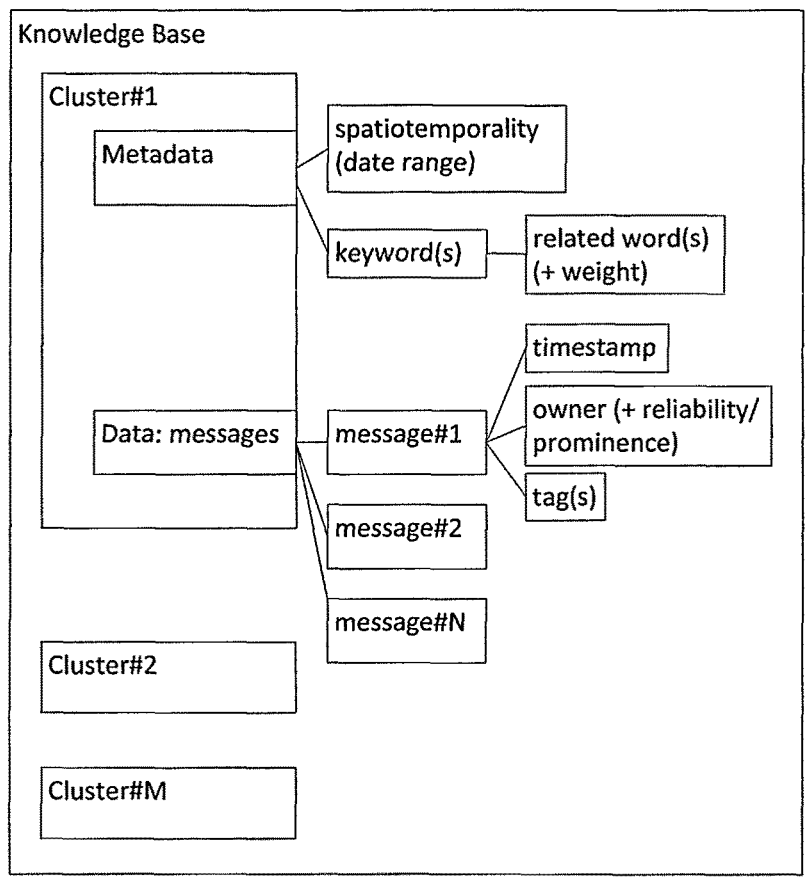
FIG. 3 shows a data structure of a knowledge base according to an embodiment of the invention.

FIG. 3 shows a data structure of a knowledge base according to an embodiment of the invention. Referring to FIG. 3, the knowledge base can include M number of clusters. Each cluster represents a geographic area and establishes representative information for the geographic area associated with the cluster. Each cluster is established from a collection of N number of messages (or other social media data). Each message includes a timestamp, owner information (with associated reliability and prominence values), and tags. Metadata associated with each cluster includes spatiotemporal information (e.g., place and time) and one or more keywords. For each keyword included as part of the representative information for the geographic area associated with the cluster, related words (and associated weight) can be included.

Once a knowledge base is created, it can be used to provide estimated locations for non-geolocated social media data.

Figure 4:
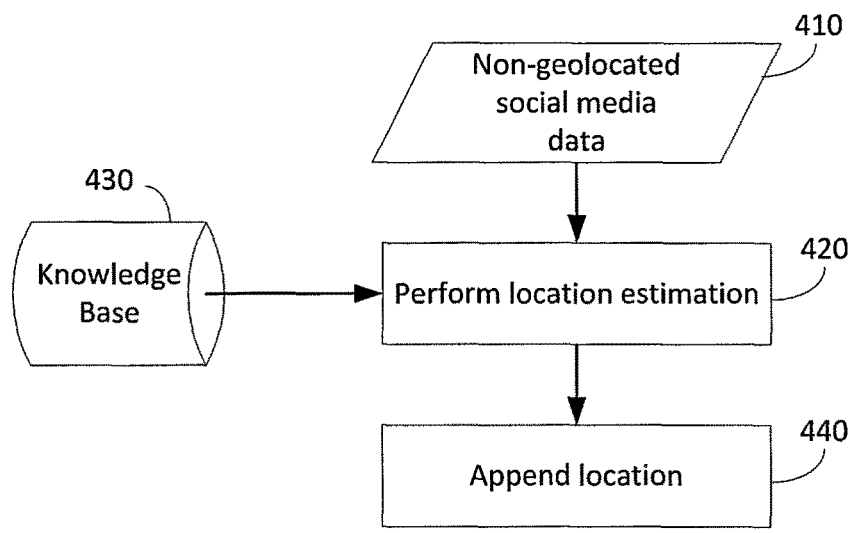
FIG. 4 shows a process flow for assigning an approximate geolocation to social media data that does not contain location coordinates in its metadata according to an embodiment of the invention.

FIG. 4 shows a process flow for assigning an approximate geolocation to social media data that does not contain location coordinates in its metadata according to an embodiment of the invention.

Referring to FIG. 4, from the one or more databases containing the social media data being analyzed, the non-geolocated social media data can be obtained (410) and a location estimation performed (420) using a knowledge base 430. The process of assigning estimated geolocations to social media data can be performed by mining the non-geolocated social media data (410); analyzing this data using automated text analysis tools for named entity recognizers (locating and classifying text into predefined categories) as well as associated keyword queries; and finding a cluster from the knowledge base 430 containing representative tags to which the non-geolocated social media data most closely relates.

Once the suitable cluster or clusters to which the social media data relates are determined, the location associated with the determined cluster(s) can be appended to the non-geolocated social media data (440) for use in further analysis of the social media data.

Information from the non-geolocated social media data used to identify a source location of an item can be extracted from the textual content such as tags, image descriptions and reader comments using the automated text analysis tools. The identifying information is compared to the representative information for each cluster of the knowledge base 430. The representative information from each cluster (representing a geographical area) can include the representative keyword(s) and location and date range (spatio-temporal information).

In an ideal case, the comparing is performed in parallel—each extracted keyword from the non-geolocated social media data is compared to every cluster in parallel. Key words of the cluster are compared with key words of the message (or other non-geolocated social media data) and the cluster having the highest probability match can be selected. In some cases, a highest probability value out of all of the clusters may not be sufficiently high to be able to determine that a non-geolocated message or image belongs to that cluster. Accordingly, certain embodiments incorporate a threshold above which a useful probability will be. Then, a cluster is selected that has the highest probability above the threshold.

In many cases, there may be a limitation in the number of available parallel machines. Computations can then be optimized through any suitable method such as, but not limited to, using hash tables.

Analytical techniques can also be employed to improve precision and remove error of estimated locations.

A greater understanding of the present invention and of its many advantages may be had from the following examples, given by way of illustration. The following examples are illustrative of some of the methods, applications, embodiments and variants of the present invention. They are, of course, not to be considered in any way limitative of the invention. Numerous changes and modifications can be made with respect to the invention.

Example Social Media Data:

The image hosting website Flickr contains billions of images. However, only a fraction of the photographs on Flickr are geo-referenced (referred to herein as "geolocated" or having a geolocation). Other hosting sites have similar limitations. Accordingly, an analysis on this geolocated data can be performed to form clusters of images in order to geolocate many of the other images that are not originally provided with coordinates.

Figure 5:
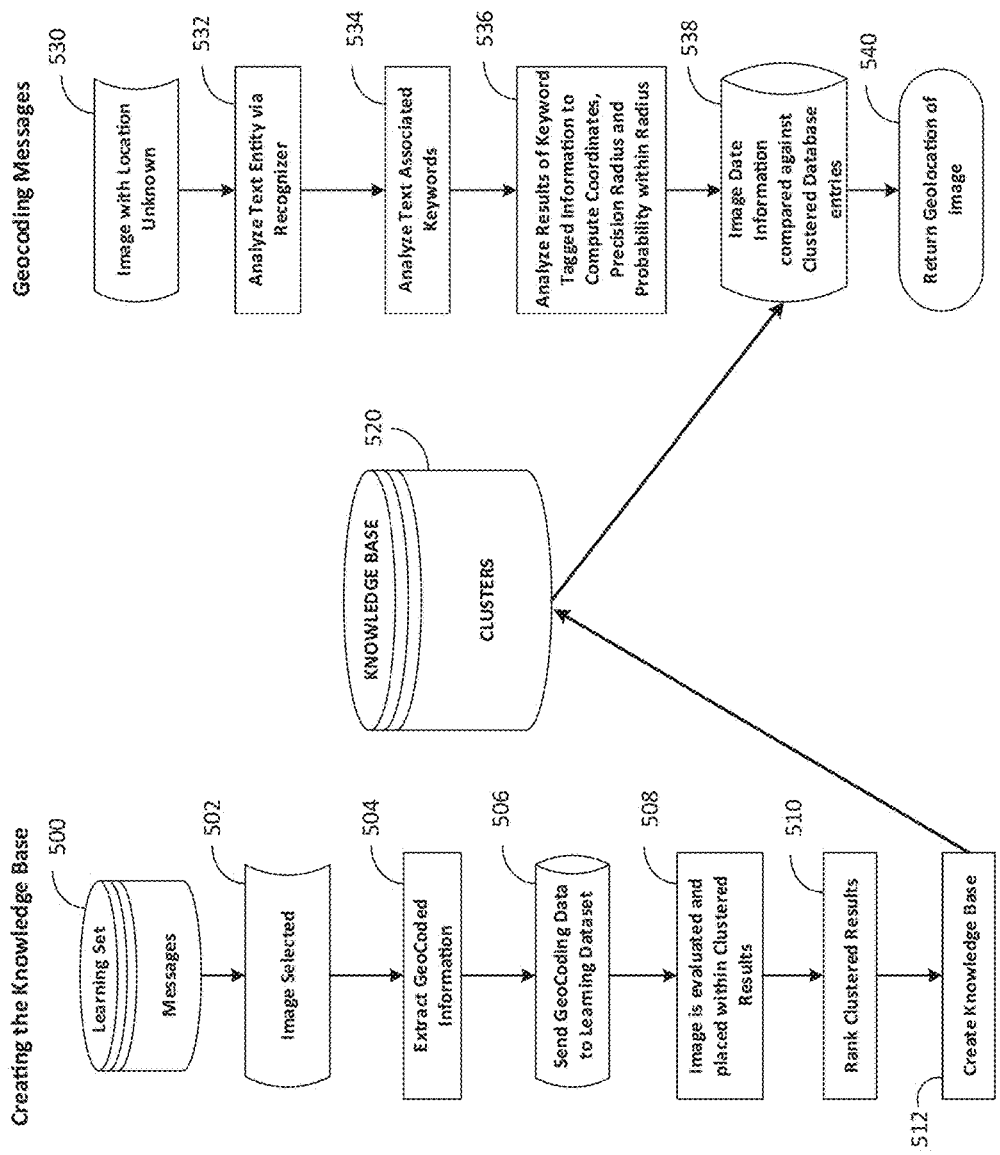
FIG. 5 shows a process flow diagram according to an embodiment of the invention.

FIG. 5 shows a process flow diagram according to an embodiment of the invention. The process shown in FIG. 5 may be carried out on social media images, such as those found on the Flickr, as well as on other social media data (whether the messages contain images or text or both or even audio). Referring to FIG. 5, when creating a knowledge base, a learning set of geolocated messages 500 may be obtained from a database of social media messages. An image 502 can be selected from the learning set of geolocated images 500, and the geocoded information (i.e., the coded form of the geolocation information) extracted (504) from the image 502.

The geocoding data can be stored in a learning dataset 506 and the image 502 evaluated and placed within clustered results (508). Then, the clustered results can be ranked (510). In operation 512, a knowledge base 520 can be created from the ranked clustered results.

Once the knowledge base 520 exists, non-geolocated messages (e.g., images, text) can have geocodes appended to them. For example, an image having an unknown location 530 can be analyzed for text entities via a recognizer (532), and the text associated keywords can be analyzed (534). The results of the keyword tagged information can be analyzed to compute coordinates, precision radius and probability within radius (536). Analysis may be carried out with respect to the keywords to provide an initial estimate of geographical areas the image may belong. In some cases, operation 536 may be carried out using information from the knowledge base 520. According to certain embodiments, the date information for the image can be compared against clustered database entries (538). The comparison can return results (540) providing the geolocation of the image that originally had an unknown location.

Example Knowledge Base:

The training dataset for forming a knowledge base can include a summary dataset. Using the Flickr image database, a summary dataset is obtained that includes the fields of: photo, title, owner, URL, number-of-views, license, tags, date_taken, date_uploaded, accuracy, latitude, longitude. A clustering of images can be performed for this dataset based on some of the fields mentioned above (and at least the geo-referencing/geolocating fields of latitude and longitude). Because not all of these fields contain information in the general population of images, the summary dataset can be selected for having data for these particular fields.

When building a cluster, one approach involves assigning equal importance (weights) to all geolocated messages (or images). Additional reliability can be obtained by assigning weights based on the message as derived from context, crowd affirmation, reliability of the image owner and other factors. Likewise, when determining the probability that an input message to be geolocated falls into a particular cluster, the reliability factors of this message can be considered.

Example 1

Figure 6:
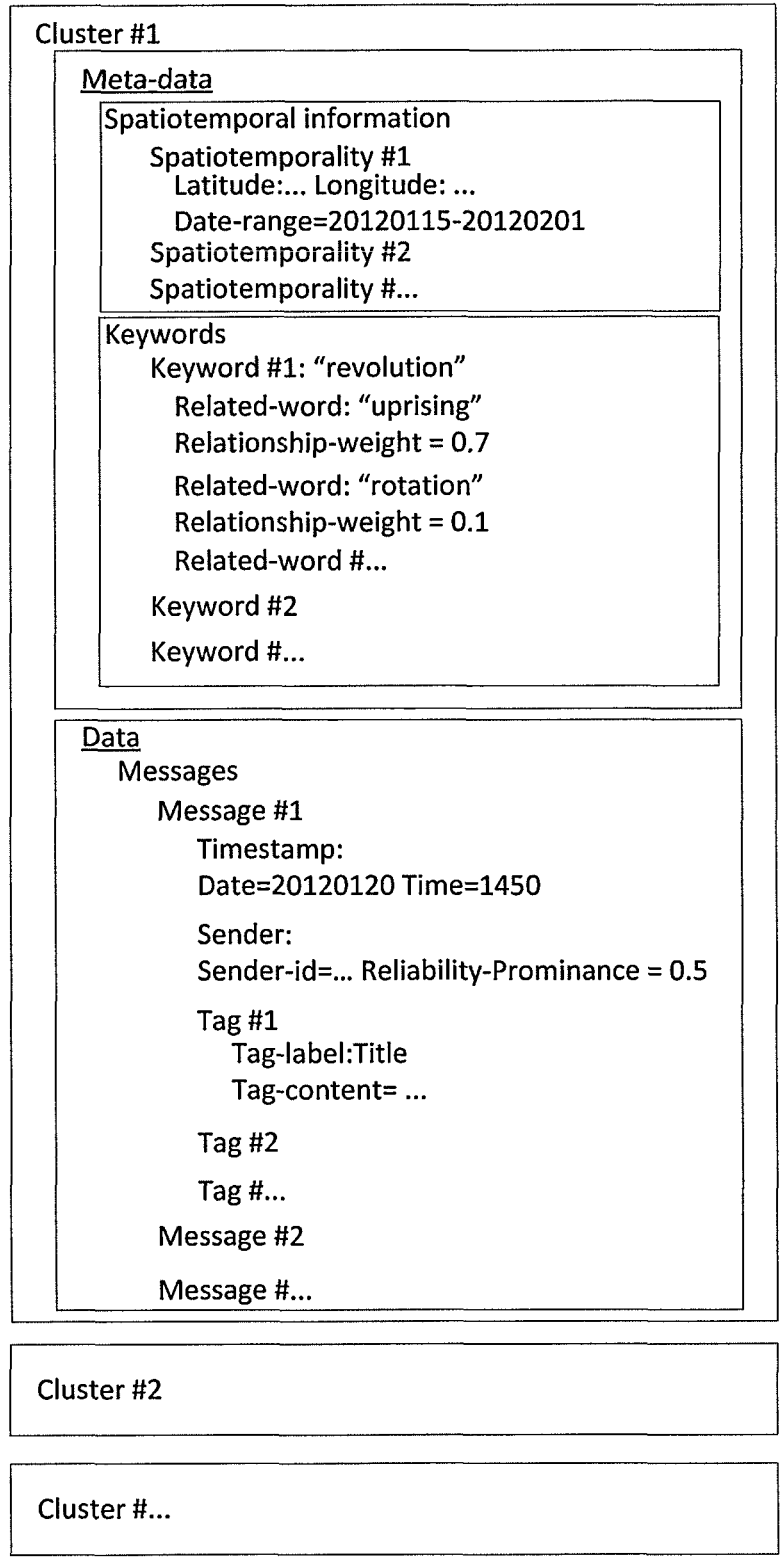
FIG. 6 shows a representative data structure of an example knowledge base.

FIG. 6 shows an example knowledge base created from geolocated social media data. As shown in FIG. 6, the knowledge base data structure includes a plurality of clusters. Each cluster includes a set of data and meta-data. The data includes the messages forming the cluster. Each message may include a timestamp, sender (with reliability and/or prominence value) and one or more tags. The meta-data of the cluster includes spatiotemporal information (latitude, longitude, and date range) along with keywords used as the cluster's representative tags. The keywords can include a particular term or terms and related terms (with corresponding weight). For example, a keyword of "revolution" may have related words of "uprising" and "rotation". For the date range of Jan. 15, 2012-Feb. 1, 2012, the likelihood that the term "uprising" would be used (as a related word describing similar items as "revolution") is given a weight of 0.7, whereas the use of "revolution" in reference to a related term (but different meaning) "rotation" is given a weight of 0.1.

Example 2

An analysis of the summary dataset may give a result that 90% of the originally geolocated Flikr images with keyword "oil" and meta-keyword "Alabama" are Spatio-temporally clustered at {Latitude 30.276, Longitude=−87.5534 Date=2010-06-15} within a spatial radius of 10 miles and temporal radius of 10 days. In the examples, this cluster is referred to as cluster-A. A "meta-keyword" is either an actual keyword in the title or description of the image, or a synonym of same, or a geographic super-division of any geographic name that is a keyword or a geographic area close to or covering the coordinates of the original geolocated image.

Examples of Geolocation Estimation

Example 1

A non-geolocated social media data item may be an image, for example, an image related to the Deepwater Horizon Oil Spill. Such an image may be tagged with "oil spill" and have a time/date stamp corresponding to the period of time during this disaster. Although these tags may help identify this image as being related to the oil spill (and associated with certain clusters containing representative tags related to an oil spill), it is not readily apparent where the picture was taken because affected area of the spill is expansive.

By using certain embodiments of the invention, the keywords of "oil" and "spill" along with other keywords and combinations of keywords are searched that would help to better determine a more precise location. For example, if the image is also tagged with "beach" and "Pensacola", then it may be possible to determine that the image originated from a beach in Pensacola, Fla.

Example 2

For the cluster-A corresponding to {Latitude 30.276, Longitude=−87.5534 Date=2010-06-15} within a spatial radius of 10 miles and temporal radius of 10 days and having the keyword "oil" and meta-keyword "Alabama," when a non-geolocated image having a date of Jun. 14, 2010 and a description: "Oil spill damage in Alabama," a higher confidence value may be attributed to this image and cluster as compared to the Example 1.

Example 3

In a case where an image dated Jun. 14, 2010 has the description "Oil contamination on Orange Beach," the geographic name "Orange Beach" can make the search for the best cluster more complicated than in Example 2. "Orange Beach" may be associated with many places in the world, including Alabama; however, embodiments can use "Orange Beach and the date Jun. 14, 2010 and the keyword "oil" to arrive at the cluster-A.

Example 4

In a case where an image dated Jun. 14, 2010 has the description "Tar contamination on Orange Beach," a similar approach as described with Example 3 is used. Here, "Tar" is ontologically related to "Oil"—so a weight associated with the related word "Tar" may be used to geolocate the image.

A cluster can be defined by a conjunction of keywords, e.g. "oil+spill". A message about "tar contamination" would match the "oil+spill" cluster because "tar" is ontologically related to "oil" and "contamination" related to "spill".

Example 5

For some keywords or combination of keywords, the space-time can be partitioned into multiple clusters, which may or may not overlap in time. For example, there may be a case where 30% of source-geolocated messages have keywords ontologically related to "oil+spill" and are clustered within 20 miles and 10 days radii from {Latitude 30.276, Longitude=−87.5534 Date=2010-06-15} [cluster C1], 25% are within 15 miles and 8 days of {Latitude 40.576, Longitude=−87.8 Date=2010-07-15} [cluster C2] and 35% are within 10 miles and 12 days of {Latitude 45, Longitude=−90.5 Date=2010-06-13} [cluster C3].

Given these three clusters, when using an implementation of an embodiment of the invention to assign an estimated location to a non-geolocated message about "tar contamination" dated 2010-07-20, the message is geolocated to (40.576,−87.8) with precision radius of 10 miles. However, another message with same keywords, but a date of 2010-06-12 cannot be geolocated with high confidence unless it has some additional information about location: if this other message contains any meta keywords geographically positioning it within Alabama or it has quasi-geographic keywords such as "beach" then the message can be placed with high confidence at (30.276,−875534) with a 10-mile precision radius.

Operating Environment

Figure 7:
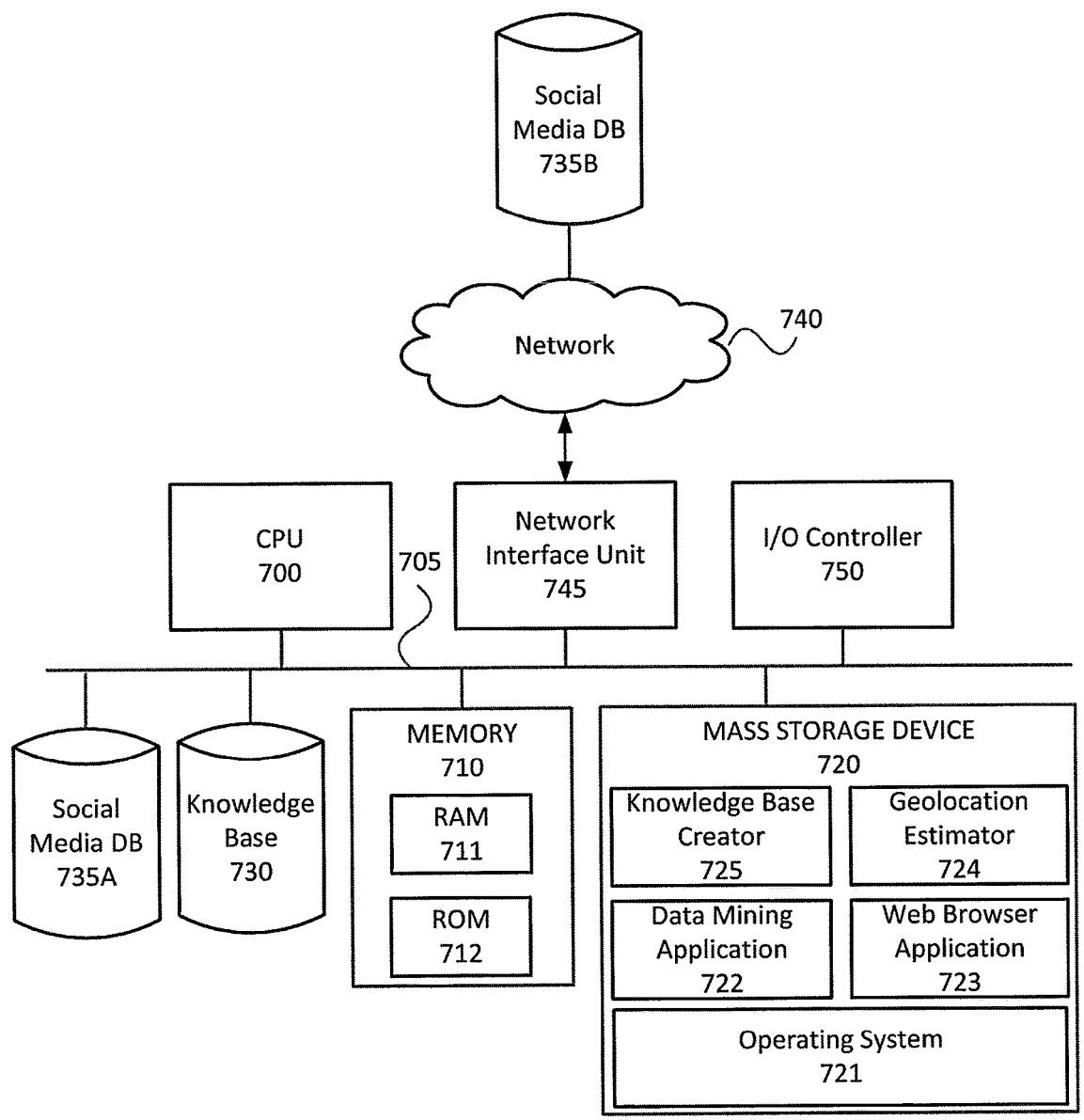
FIG. 7 shows computer architecture diagram illustrating a computing system capable of implementing aspects of embodiments presented herein.

FIG. 7 shows a computer architecture diagram illustrating a computing system capable of implementing aspects of embodiments presented herein. Aspects of the system shown in FIG. 7 can be embodied as a server computer, mobile phone, a smart phone, a desktop computer, a tablet computer, and/or a laptop computer as some examples.

Referring to FIG. 7, a computing device can include a central processing unit 700 ("CPU") connected to components via a system bus 710; and a system memory 710, including a random access memory 711 ("RAM") and a read-only memory ("ROM") 712. The RAM 711 generally provides a local storage and/or cache during CPU operations and the ROM 712 generally stores the basic routines that help to transfer information between elements within the computer architecture such as during startup. A mass storage device 720 is included for storing the operating system 721, and one or more application programs including, but not limited to, a data mining application 722, a web browser application 723, the geolocation estimator 724, and the knowledge base creator 725. A knowledge base 730 and social media data base (DB) 735A may be stored as part of or separate from the mass storage device 720.

The mass storage device 720 can be connected to the CPU 700 through a mass storage controller (not shown) connected to the bus 705. The mass storage device 720 and its associated computer-readable media (including in some cases the knowledge base 730 and social media database 735A) provide non-volatile storage for the computer architecture. It should be understood that the mass storage device 720 can include any available computer-readable storage media or communication media accessed by the computer architecture.

In some cases, all or a part of the databases may be stored remotely (such as on a server or by a cloud service). For example, the social media DB 735B may be stored remotely and accessed over a network 740 through a network interface unit 740 connected to the bus 705.

The network 740 can be, but is not limited to, a cellular network, a satellite network, the Internet, a local area network (LAN), a wide area network (WAN), a WiFi network, an ad hoc network, or a combination thereof. Such networks are widely used to connect various types of network elements, such as routers, servers, and gateways. It should also be understood that the invention can be practiced in a multi-network environment having various connected public and/or private networks. As will be appreciated by those skilled in the art, communication networks can take several different forms and can use several different communication protocols. Certain embodiments of the invention can be practiced in distributed-computing environments where tasks are performed by remote-processing devices that are linked through a communications network. In a distributed-computing environment, program modules can be located in both local and remote computer storage media. Computer storage media include computer-readable media that may contain instructions that implement the various applications and systems described herein.

The computer architecture also may include an input/output controller 750 for receiving and processing input from a number of other devices, including a keyboard, mouse, touch screen, touch pad, electronic stylus, or microphone (not shown). Similarly, the input/output controller 750 may provide output to a display screen, a printer, speakers, or other type of output device (not shown).

It should be appreciated that the software components described herein may, when loaded into the CPU 700 and executed, transform the CPU 700 and the overall computer architecture from a general-purpose computing system into a special-purpose computing system customized to facilitate the functionality presented herein. The CPU 700 may be constructed from any number of transistors or other discrete circuit elements, which may individually or collectively assume any number of states. More specifically, the CPU 700 may operate as a finite-state machine, in response to executable instructions contained within the software modules disclosed herein. These computer-executable instructions may transform the CPU 700 by specifying how the CPU 700 transitions between states, thereby transforming the transistors or other discrete hardware elements constituting the CPU 700.

Certain techniques set forth herein may be described or implemented in the general context of computer-executable instructions, such as program modules, executed by one or more computing devices. Generally, program modules include routines, programs, objects, components, and data structures that perform particular tasks or implement particular abstract data types.

Embodiments may be implemented as a computer process, a computing system, or as an article of manufacture, such as a computer program product or computer-readable medium. Certain methods and processes described herein can be embodied as code and/or data, which may be stored on one or more computer-readable media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process.

Computer-readable media can be any available computer-readable storage media or communication media that can be accessed by the computer system.

Communication media include the mechanisms by which a communication signal containing, for example, computer-readable instructions, data structures, program modules, or other data, is transmitted from one system to another system. The communication media can include guided transmission media, such as cables and wires (e.g., fiber optic, coaxial, and the like), and wireless (unguided transmission) media, such as acoustic, electromagnetic, RF, microwave and infrared, that can propagate energy waves. Computer-readable instructions, data structures, program modules, or other data can be embodied as a modulated data signal in, for example, a wireless medium such as a carrier wave or similar mechanism such as employed as part of a spread spectrum technique. The term "modulated data signal" refers to a signal that has one or more of its characteristics changed or set in a manner as to encode information in the signal. The modulation may be analog, digital or a mixed modulation technique. Communication media, particularly carrier waves and other propagating signals that may contain data usable by a computer system, are not included as computer-readable storage media.

By way of example, and not limitation, computer-readable storage media may include volatile and non-volatile, removable and non-removable media implemented in any method or technology for storage of information such as computer-readable instructions, data structures, program modules or other data. For example, a computer-readable storage medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); or other media now known or later developed that is capable of storing computer-readable information/data for use by a computer system. "Computer-readable storage media" do not consist of carrier waves or propagating signals In addition, the methods and processes described herein can be implemented in hardware modules. For example, the hardware modules can include, but are not limited to, application-specific integrated circuit (ASIC) chips, field programmable gate arrays (FPGAs), and other programmable logic devices now known or later developed. When the hardware modules are activated, the hardware modules perform the methods and processes included within the hardware modules.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

It should be understood that the examples and embodiments described herein are for illustrative purposes only and that various modifications or changes in light thereof will be suggested to persons skilled in the art and are to be included within the spirit and purview of this application.

What is claimed is:

1. A computer-implemented method of encoding geolocation metadata onto a social media data item, the method comprising:
   providing a remote knowledge database comprising M number of clusters of social media data items, each respective cluster representing a geographic area and establishing representative information for the geographic area associated with the respective cluster, each respective cluster being represented by a plurality of representative tags and comprising a plurality of social media data items that each respectively contain metadata that indicate origination from a common spatial-temporal location, each representative tag of the plurality of representative tags being an image, a keyword, or a phrase that is associated with the common spatial-temporal location;
   providing a non-transitory computer-readable medium comprising stored instructions, that when executed cause at least one processor to:
      receive, by a receiving device, a social media data item that is not encoded with geolocation metadata;
      detect textual information contained in the social media data item not encoded with geolocation metadata, the textual information comprising visual images and text;
      access the remote knowledge database via a network;
      traverse, in parallel, each respective cluster in the remote knowledge database to detect a correlation between the textual information contained in the social media data item not encoded with geolocation metadata and each representative tag the plurality of representative tags of each respective cluster in the remote knowledge database;
      rank each representative tag of the plurality of representative tags of each respective cluster by determining a strength of correlation between the textual information in the social media data item and each representative tag the plurality of representative tags of each respective cluster in the remote knowledge database based upon weighted values of each representative tag of the plurality of representative tags of each respective cluster;
      receive, from the remote knowledge database, the geolocation of the respective cluster having a representative tag that has the strongest respective correlation with the textual information contained in the social media data item not encoded with geolocation metadata; and
      append, the social media data item not encoded with geolocation metadata with metadata containing the geolocation of the respective cluster whose representative tag has the strongest correlation with the textual information contained in the social media data item not encoded with geolocation metadata.

2. The method according to claim 1, wherein traversing each respective cluster, in parallel, in the remote knowledge database comprises:
   comparing, in parallel, the textual information of the social media data item not encoded with geolocation metadata to each representative tag of the plurality of representative tags of each respective cluster in the remote knowledge database to determine a highest probable matching respective cluster.

3. The method according to claim 2, wherein determining a strength of correlation between the textual information in the social media data item not encoded with geolocation metadata and each representative tag of the plurality of representative tags of each respective cluster in the remote knowledge database comprises:

detecting a geolocation of a respective cluster having a representative tag that has a probability value or correlating to the textual information containing in the social media item non encoded with geolocation metadata that is above a threshold probability value.

4. The method according to claim 1, wherein the textual information from the social media data item not encoded with geolocation metadata comprises tags, image descriptions, and reader comments.

5. The method according to claim 1, further comprising creating the remote knowledge database of social media data items of known geolocations.

6. The method according to claim 5, wherein creating the remote knowledge database comprises:

providing a plurality of social media data items to a database, each social media data item encoded with metadata indicating the geolocation of the origination of the social media data item;

grouping the plurality of social media data items into M number of clusters, each respective cluster comprising social media data items originated within a predetermined spatial and temporal range of a known spatial-temporal location;

extracting a plurality of representative tags from each social media data item in each respective cluster, each representative tag of the plurality of representative tags being an image, a keyword, or a phrase associated with the known common spatial-temporal location;

assigning each representative tag of the plurality of representative tags a weighted value for each respective cluster indicating a strength of correlation between each representative tag of the plurality of representative tags and the known common spatial-temporal location of each respective cluster; and storing, in the computer memory, the respective clusters, the plurality of representative tags, and associated weighted values of each tag of the plurality of representative tags.

7. The method according to claim 6, further comprising:

extracting data, from each respective social media data item, related to reliability and truthfulness of the textual information contained in each respective social media data item.

8. The method according to claim 7, the data related to reliability and truthfulness of the textual information comprising at least one of frequency of use, ownership, and number of views.

9. A system for data-mining social media data items of unknown geolocation origin, the system comprising:

one or more processors;

one or more non-transitory computer readable media;

a remote knowledge database creation and updating application stored on at least one of the one or more non-transitory computer readable media that, when executed by at least one of the one or more processors, directs the at least one of the one or more processors to:

receive, by a receiving device, a plurality of social media data items, each social media data item respectively encoded with metadata indicating the geolocation of the origination of the social media data item;

group the plurality social media data items into M number of clusters, each respective cluster being comprised of social media data items originated within a predetermined range of a known spatial-temporal location;

extract a plurality of representative tags from each social media data item in each respective cluster, a representative tag comprising at least one image, keyword, or phrase associated with the known common spatial-temporal location;

assign each representative tag of the plurality of representative tags with a weighted value indicating a respective strength of correlation between each representative tag of the plurality of representative tags and the known common spatial-temporal location;

store, in computer memory, the respective clusters, the plurality of representative tag of each respective cluster, and the respective associated weighted values of the representative tags of each respective cluster; and determine an outlier of the social media data item based on location and time; and receive a social media data item that is not encoded with geolocation metadata;

detect, by text recognition software, textual information contained in the social media data item;

detect, via image recognition software, visual information contained in the social media data item;

access a remote knowledge database, stored in the computer memory, of clustered social media data items, each respective cluster being represented by a plurality of representative tags and comprising social media data items that contain metadata that indicates origination from a common spatial-temporal location, a representative tag being an image, a keyword, or a phrase associated with the known common spatial-temporal location;

traverse, in parallel, each respective cluster in the remote knowledge database to detect a correlation between the textual information and each representative tag of the plurality of representative tags of each respective cluster in the remote knowledge database;

traverse, in parallel, each respective cluster in the remote knowledge database to detect a correlation between the visual information and the tags of each respective cluster in the remote knowledge database;

rank each representative tag of each respective cluster by determining a strength of correlation between the textual information in the social media data item and the tags of each respective cluster in the remote knowledge database based upon weighted values of tags in the respective cluster;

determine a strength of correlation between the textual information in the social media item and the tags of each respective cluster in the remote knowledge database based upon weighted values of visual tags of the respective cluster;

receive, from the remote knowledge database, the geolocation of the respective cluster having a representative tag that has the strongest respective correlation with the textual information contained in the social media data item not encoded with geolocation metadata; and append the social media data item not encoded with geolocation metadata with metadata containing the geolocation of the respective cluster whose representative tag has the strongest correlation with the textual information.

10. The system according to claim 9, wherein the remote knowledge database creation and updating application, when executed by at least one of the one or more processors, further directs the at least one of the one or more processors to create time-based groupings of the social media data item for each respective geolocation-based cluster.

11. The system according to claim 9, wherein the remote knowledge database creation and updating application, when executed by at least one of the one or more processors, further directs the at least one of the one or more processors to determine, for each respective geolocation-based cluster, a deviation in date information associated with the social media data item in the respective geolocation-based cluster.

12. The system according to claim 9, wherein, the at least one of the one or more processors is directed to extract at least one tag for each respective geolocation-based cluster from the at least one associated tag of the social media data item in the respective geolocation-based cluster creating the remote knowledge database by using textual information of the social media data item and information related to reliability and truthfulness of the textual information.

13. The system according to claim 12, wherein the information related to reliability and truthfulness of the textual information comprises at least one of frequency of use, ownership, and number of views.

14. The system according to claim 9, wherein the textual information of the non-geolocated social media data item comprises at least one of tags, image descriptions and reader comments.

15. The system according to claim 9, wherein the non-geolocated social media data item is an image or message posted to a social media network.

16. A system for data-mining social media data items of unknown geolocation origin, the system comprising:
a remote knowledge database comprising M number of clusters of social media data items, each respective cluster representing a geographic area and establishing representative information for the geographic area associated with the respective cluster, each respective cluster being represented by a plurality of representative tags and comprising social media data items that contain metadata that indicates origination from a common spatial-temporal location, each representative tag of the plurality of representative tags being an image, a keyword, or a phrase from the at least one social media data item and associated with the indicated common spatial-temporal location;
one or more non-transitory computer readable media; and
instructions stored on at least one of the one or more non-transitory computer readable media that, when executed by a processor, directs the processor to:
extract information from textual information associated with a social media data item not encoded with geolocation metadata;
traverse, in parallel, each respective cluster in the remote knowledge database including a plurality of clusters of geo-located social media data items to determine at least one geocode to which the information from the textual information relates;
append, with geolocation metadata, the social media data item not already encoded with geolocation metadata according to the at least one geocode contained in the remote knowledge database to which the information from the textual information relates; and
determine an outlier of the geo-located social media data items based on location and time.

17. The system according to claim 16, wherein the instructions direct the processor to extract information from textual information associated with the non-geolocated social data media item by analyzing the textual information for recognizable entities and keywords,
wherein the instructions direct the processor to search the remote knowledge database to determine the at least one geocode to which the information from the textual content information relates by comparing the recognizable entities and keywords to information stored in the remote knowledge database.

18. The system according to claim 17, wherein the instructions further direct the processor to determine the at least one geocode to which the information from the textual information relates by computing coordinates, precision radius and probability within a radius for the recognizable entities and keywords using information stored in the remote knowledge database.

19. The system according to claim 16, wherein the textual information of the non-geo-located social media data item comprises at least one of tags, image descriptions, and reader comments.

* * * * *